United States Patent [19]

Holden et al.

[11] 4,188,432

[45] Feb. 12, 1980

[54] ARTICLES RESISTANT TO ATTACK BY FATTY SUBSTANCES, MADE FROM POLYSTYRENE BLENDS, AND COMPOSITIONS

[75] Inventors: Geoffrey Holden, Houston, Tex.; Lam H. Gouw, Laren, Netherlands

[73] Assignee: Shell Oil Company, Houston, Tex.

[21] Appl. No.: 892,045

[22] Filed: Mar. 30, 1978

[51] Int. Cl.$^2$ .................... B65D 81/02; C08L 53/02
[52] U.S. Cl. .................... 428/35; 428/517; 428/521; 525/69; 525/95
[58] Field of Search ............ 260/876 B; 428/35, 517, 428/521

[56] References Cited

U.S. PATENT DOCUMENTS

| | | | |
|---|---|---|---|
| 3,894,117 | 7/1975 | Agouri et al. | 260/876 B |
| 4,031,166 | 6/1977 | Bronstert et al. | 260/876 B |
| 4,076,768 | 2/1978 | Saunders et al. | 260/876 B |

FOREIGN PATENT DOCUMENTS 1363466  8/1974  United Kingdom .

*Primary Examiner*—J. Ziegler

[57] ABSTRACT

Shaped articles which are resistant to attack by fatty substances and chemicals and which have impact resistance comparable to high impact polystyrene are produced by extrusion or injection molding of a composition consisting essentially of high impact styrene-butadiene graft copolymer or a mixture thereof with no more than about 55% styrene homopolymer and small proportions of polyethylene or polypropylene and of a block copolymer X-Y-X in which each X is a polystyrene block of about 5,000 to 10,000 molecular weight and Y is a hydrogenated polybutadiene block of 25,000 to 50,000 molecular weight. The articles are characterized by having a skin which is substantially enriched in polyolefin.

5 Claims, No Drawings

ARTICLES RESISTANT TO ATTACK BY FATTY SUBSTANCES, MADE FROM POLYSTYRENE BLENDS, AND COMPOSITIONS

BACKGROUND OF THE INVENTION

1. Field of the Invention

This invention relates to improved articles produced from modified, impact resistant polystyrene compositions.

2. Description of the Prior Art

Polystyrene is an economically priced thermoplastic material having many desirable properties. For a variety of uses polystyrene is employed as an impact-improved product, made as a graft polymer of styrene and an elastomer, typically a butadiene-containing polymer, particularly polybutadiene.

An undesirable property of polystyrene is its tendency to deteriorate drastically under the influence of materials which induce stress-cracking, such as fatty substances, e.g., fatty foodstuffs. The deterioration consists of surface crazing of polystyrene articles and drastic loss of impact strength of articles made from impact-improved polystyrene compositions. Some major fields of use have been foreclosed to polystyrene because of these objectionable properties. Styrene copolymers such as ABS (a copolymer of acrylonitrile, butadiene and styrene) are used where resistance to chemically induced stress cracking is required, such as in containers for fatty foodstuffs.

The present invention overcomes these deficiencies of conventional high impact polystyrene and provides articles, made from a relatively inexpensive composition based on polystyrene-diolefin graft copolymers and polyolefins, which are substantially a resistant to chemically induced stress cracking, such as deterioration by fatty substances, as articles made from ABS, and typically have the impact resistance of impact-improved polystyrene.

It is known that blends of polystyrene and polyolefins generally have very poor impact properties because the polymers tend to form separate domains within an article, so that articles formed from such blends delaminate under stress.

It has been taught that certain materials, and particularly certain block copolymers, can be employed to improve the compatibility of styrenic and olefinic polymers in blends. Such disclosures are contained in two U.S. patents to Agouri et al. and in a series of patent cases of Badische Anilin und Soda Fabrik A.G. (BASF).

U.S. Pat. No. 3,894,117 to Agouri et al., is directed to the preparation of "homogeneous" polymer compositions containing at least one olefin polymer and/or one arylvinyl polymer. The method consists of adding to either or to a mixture of both of these polymers one or more block copolymers containing one polyolefin sequence and one polyarylvinyl sequence. The patent discloses compositions directed to various different types of uses. Thus, papers substitutes of excellent quality for printing work can be obtained from composites of 5 to 30 wt.% of the block copolymers, 2-4% polystyrene and the rest polyethylene. Composites with higher block copolymer content, and particularly low density polyethylene containing 20-50 wt.% block copolymers, are said to be useful for making articles such as bottles and pipes. Using extremely low concentrations of the block copolymers in polyolefins or polyolefin copolymers such as ethylene/vinylacetate copolymers is said to reduce post extrusion blocking. In all cases, the block copolymer used contains only two blocks.

U.S. Pat. No. 3,980,736 to Agouri et al. is a division of the above discussed patent, with an apparently identical specification.

A series of patents assigned to BASF illustrate gradual evolution of concepts dealing with the use of certain block copolymers. They will be briefly discussed in the order of their premier depot filing dates, which are stated in the parentheses following the patent number.

U.S. Pat. No. 4,031,166 (1/29/1970) is directed to substituting for the conventional elastomer in impact-improved polystyrene elastomer blends a mixture of a polyolefin and a substantially gel-free vinyl aromatic/-diene hydrocarbon polymer which may be a block copolymer, a random copolymer, or a graft copolymer. It is preferred to cross-link the resulting product. The experimental examples illustrate the invention with blends of polystyrene with low density polyethylene and the following copolymers: a styrene-butadiene-styrene block copolymer X-Y-X in which the molecular weight of the polystyrene block is an unspecified value in the range 4,000 to 215,000 and that of the polybutadiene block in the range 20,000 to 250,000; a similar X-Y-X copolymer of 25% styrene content and unstated molecular weight; a 50:50 styrene-butadiene block copolymer of unstated molecular weight; a 50:50 styrene-hydrogenated butadiene block copolymer of unstated molecular weight; a copolymer of 200,000 molecular weight metallated polybutadiene, graft-polymerized with an equal amount of styrene; and a random copolymer of butadiene/styrene. It is asserted that use of mixtures of polyolefins with any of these vinyl aromatic/diolefin copolymers in lieu of conventional elastomers, in impact polystyrene produced by blending, permits one to obtain a desired impact strength at lower elastomer content and, hence, increased rigidity; it is said to permit production of compositions of improved gloss compared with graft-polymerized impact polystyrene.

U.S. Pat. No. 3,738,907 (corresponding to German printed application 2,029,028, filed 6/12/1970) is directed to laminates of two thermplastics, bonded by an adhesive block copolymer A-B in which A is a polyvinyl aromatic block of 10,000–150,000 molecular weight and B a polyolefin block of 10,000–100,000 molecular weight in which not more than 10% of the carbon-carbon bonds are olefinically unsaturated and the molar ratio A:B is from 10:90 to 70:30, preferably from 30:70 to 60:40. It is said that these two-block copolymers provide a much better bond between the plastics material than prior art three-block copolymers and in addition are simpler to produce than three-block copolymers. The prior art three-block copolymer specifically referred to is a fully saturated A-B-A block described in German printed application number 1,569,423.

U.S. Pat. No. 3,767,521 (10/7/1970) is directed to an improvement in metal-plated sandwich panels made up of a structural thermoplastic inner ply and thin outer metal plies. The inner ply is preferably polystyrene or impact-improved polystyrene, but may be a styrene copolymer or polyethylene, polypropylene or ethylene-propylene copolymer. The improvement consists in using two separate layers of materials to provide improved adhesion between the plastic inner ply and the metal outer ply. The layer next to the metal is a conventional hot-melt adhesive. The layer between the thermoplastic composition and the hot-melt adhesive is designated an "adhesion promoter"; it is a ternary mixture of a homopolymer of styrene or a styrene copolymer with up to 35% of a second copolymer, a homopolymer of a $C_2$ to $C_4$ mono-olefin or a copolymer of such a mono-olefin with up to 35% of another monomer, and a two-block copolymer A-B in which A is a block of polystyrene of 10,000–150,000 molecular weight and B is a block of a polyolefin of 10,000–200,000 molecular weight which is at least 90% saturated. The polystyrene-to-polyolefin ratio in the adhesion promoting layer is from 0.25:1 to 4:1 by weight and the percent of block copolymer from 5–70% by weight based on the total blend composition.

United Kingdom patent specification No. 1,357,950 (10/7/1970) is directed to a laminate of two or more different thermoplastic plies including at least one composite ply made up of a thermoplastic mixture comprising (a) a homopolymer or copolymer of a vinylaromatic monomer, (b) a homopolymer or copolymer of an olefin monomer, and (c) a block copolymer A-B, which is as described in U.S. Pat. No. 3,738,907, except that the upper limit of the molecular weight of the polyolefin block is 200,000 instead of 100,000. The ratio of polyvinyl aromatic to polyolefin in this composition is from 0.25:1 to 4:1, and the total content of A-B is between 5 and 70% by weight. The composite ply is employed as an adhesive between two other thermoplastic plies which would otherwise adhere poorly. It is disclosed to be particularly suitable to provide adhesion between impact-resistant polystyrene and low density polyethylene.

U.K. patent specification No. 1,363,466 (12/12/1970) is directed to molding compositions in which a homopolymer of styrene or other vinylbenzene or a copolymer thereof is compounded with a homopolymer of an alpha monoolefinic acyclic hydrocarbon or copolymer thereof, and in which compatibility of these components is improved by the incorporation of a block copolymer A-B having the properties described in the above U.K. Pat. No. 1,357,950.

U.K. Pat. No. 1,363,466 also contains a disclosure that hydrogenated two block copolymers A-B facilitate said mixing much better than similar block copolymers, for example, non-hydrogenated two block copolymers A-B or non-hydrogenated or hydrogenated three and four block copolymers.

German printed application No. 2,137,274 (7/26/1971) is a patent of addition to German application No. 2,003,916, which corresponds to U.S. Pat. No. 4,031,166 supra. It discloses the use of copolymers of ethylene and polar vinyl components, such as ethylene-vinyl acetate, in lieu of the polyolefins of the main patent.

German printed application No. 2,201,243 (1/12/1972) is a patent of addition to German patent application No. 2,061,361. The main patent application is the equivalent of U.K. Pat. No. 1,363,466. In the main German patent, the proportion of block copolymer comprises 10–70 wt.% of the total mass. According to the patent of addition, useful properties are obtained in molding compositions containing 1–10% by weight of block copolymer A-B. It is said that such blends are particularly suitable for production of films according to the blown bubble method. The films have good surface properties and are particularly suitable as adhesives between styrene and olefin polymers for the production of multiple ply composites.

U.K. specification No. 1,427,959 (7/1/1972) is directed to a process for the manufacture of a laminate comprising an adhesion-promoting primer layer between two different thermoplastics, wherein waste material produced in further processing of the laminates is comminuted, mixed, and added during extrusion either to the adhesion promoting primer layer or to one of the outer plies. Block copolymers (X-Y)n or X(Y-X)n where X is a vinyl aromatic polymer, Y is an optionally hydrogenated diolefin polymer and "n" is an integer from 1 to 4, and wherein the transitions between the blocks may be sudden or gradual, are disclosed as the material for the primer layer. Preferred are those block copolymers in which X is a polystyrene block and Y a polybutadiene block. The molecular weight of the block copolymer is generally from 10,000 to 1,000,000. The molar ratio X:Y is from 10:90 to 70:30. The thermoplastics which are bonded by the primer layer may be "virtually any of the well-known plastics"; bonded laminates of an olefin polymer and a styrene polymer are, however, preferred.

German printed application No. 2,236,903 (7/27/1972) is directed to laminates comprising outer layers containing two different thermoplastics which may be any known thermoplastic, bonded by an adhesion-promoting layer which is a mixture of at least 5% of each of the plastics represented in the outer layers and at least 30% of a block copolymer (X-Y)n or X-(X-Y)n where n is 1 to 3 and where X is a polystyrene block and Y a diene polymer block. Block polymers of 2,3, or 4 blocks are preferred. The transition between blocks may be sudden or gradual.

Belgian Pat. No. 814,711 (5/8/1973) is directed to the preparation of foamed materials for insulating buildings, the compositions being prepared from mixtures of polyolefins with 10–95 wt.% styrene polymer, mixed with a volatile blowing agent and 0.5–10 wt.% of a hydrogenated styrene-butadiene block copolymer or a polyolefin grafted with styrene. The block copolymers are not further detailed but reference is made for their preparation to HOUBEN-WEYL, Methoden Der Organischen Chemie, Vol. 14/1, p. 659 (1961).

U.S. Pat. No. 4,020,025 (5/8/1973) is based on the same German application as Belgian Pat. No. 814,711 but has some additional description of the block copolymers, giving the molecular weight of the hydrogenated styrene/butadiene block polymer as 3,000 to 800,000, preferably 10,000 to 100,000, with 10 to 80% styrene and consisting of individual blocks of pure polybutadiene and polystyrene segments or polybutadiene segments containing styrene with blocks of pure polystyrene segments. The patent emphasizes that in the expanded compositions the styrene polymer is dispersed in the polyolefin and the particle size of the styrene polymers is less than 50 and preferably less than 10 microns, the polyolefin forming the continuous phase.

Belgian Pat. No. 826,831 (3-20-1974) is directed to foamable plastic compositions containing a mixture of polystyrene, polyethylene, a combining agent and a blowing agent. A combining agent is a material which when mixed with polystyrene and polyethylene causes a fine distribution of one polymer in the other and may be a graft polymer of styrene on polyethylene or a copolymer of ethylene and styrene. Reference is made to polymers of blocks of styrene and hydrogenated butadiene described in the Houben-Weyl reference supra, page 833. The polymers have molecular weights between 3,000 and 800,000 and contain between 10 and 80% by weight styrene.

In summary, the prior art represented by the Agouri patents shows compositions containing a major proportion of polyolefin, a small proportion of polystyrene and a two-block polystyrene-polyolefin copolymer to improve their compatibility, primarily for the purpose of improving the impact characteristics of the polymer and also to produce a paper substitute.

In the series of BASF patent cases, the first-filed case is broadly directed to the use of a variety of different vinyl aromatic/diene copolymers in admixture with a polyolefin as additives blended with styrene homopolymer to provide impact-improved polystyrene which is said to be superior in rubber utilization to conventional polystyrene/elastomer blends and superior in gloss to graft polymerized high impact polystyrene. The next five BASF patent cases all are directed to using two-block copolymers of polystyrene and hydrogenated diolefin, primarily as adhesion promoters for laminates and also to provide compatibility of polystyrene and polyolefins. In the last-filed four BASF patent cases, use of block copolymers is broadly disclosed, again for the purpose of providing adhesion-promoting compositions, except in the last-filed Belgian and U.S. patents, which are directed to foam compositions in which polystyrene is dispersed as discrete particles in the polyolefin.

SUMMARY OF THE INVENTION

The primary object of this invention is to provide thermoplastic articles consisting predominantly of polystyrene but having the desirable chemical resistance which characterizes the more expensive styrene copolymers such as ABS.

The articles of this invention are prepared from blends of a major proportion of high impact polystyrene (a graft copolymer of styrene with a diolefin elastomer), or alternatively, a major proportion of a mixture of high impact polystyrene and styrene homopolymer, with a relatively small proportion of polyethylene or polypropylene and a relatively small proportion of certain specific block copolymers X-Y-X which are polystyrene-hydrogenated polybutadiene-polystyrene copolymers having blocks of specified relatively low molecular weight ranges. Extruded or injection molded articles made from compositions within the specified ranges have satisfactory physical properties, including impact resistance, and are characterized by excellent resistance to chemicals, sometimes referred to as crazing agents, which induce stress cracking in conventional polystyrene or high impact polystyrene, primarily fatty materials such as fatty foodstuffs, e.g., butter or margarine, cooking oil, etc., but also other chemicals, e.g., certain alcohols and hydrocarbons.

Articles made from the specified compositions by extrusion or by injection molding have a characteristic microstructure which results in their unusual properties. It has been found that in the body of these articles both the polystyrene and the polyolefin are continuous phases which form one interlocking structure, while the outer surface layer or skin is substantially enriched in polyolefin, thus providing the excellent resistance to fatty organic compounds which is characteristic of the articles of this invention.

The block copolymer is believed to act as a mechanical or structural stabilizer which interlocks the polymer structure networks in the body of the articles.

This invention provides thermoplastic articles resistant to environmental stress cracking, such as is induced by exposure to fatty substances. The articles are produced by extrusion or injection molding, or by further non-destructive shaping, such as thermoforming, of an extruded or molded article from a composition which consists essentially of (A) 60-93 parts by weight, per 100 parts of the composition, of a polystyrene component consisting of 100 to about 45% of a thermoplastic styrene-diolefin elastomer graft copolymer with 0 to about 55% of thermoplastic styrene homopolymer; (B) 2 to 30 parts by weight, per 100 parts of the composition, of polyethylene or polypropylene; and (C) 5 to 20 parts by weight, per 100 parts of the composition, of a block copolymer X-Y-X where each X is a polystyrene block of about 5,000 to 10,000 molecular weight and Y is a hydrogenated polybutadiene block of about 25,000 to 50,000 molecular weight, the total molecular weight of the block copolymer being less than about 60,000.

The articles of the invention are characterized by having a skin layer consisting predominantly of polyolefin, which imparts resistance to fatty substances to the articles.

Description of the Preferred Embodiments

The compositions from which the articles of this invention are made consist essentially of a polystyrene graft copolymer component "A", a polyolefin component "B", and a block copolymer component "C". In addition, these compositions may contain conventional additives such as stabilizers, dyes, pigments, fillers or the like.

Component "A", in one modification, is a graft copolymer of styrene and an impact-improving elastomer, such as butadiene or a butadiene-containing elastomer. Such impact-improved polystyrene compositions are commercially available materials. Their methods of preparation and properties are well known. They are conventionally designated "high impact polystyrene", abbreviated "HIPS". The elastomer content of HIPS is typically in the range of 5-15% by weight, basis styrene, and is present as dispersed particles containing occluded polystyrene. The compositions may contain minor amounts of substituted vinyl aromatic compounds copolymerized with the styrene.

In a second modification, component "A" is a mixture of at least about 45% of high impact polystyrene graft copolymer, as described above, with no more than about 55% of general purpose styrene homopolymer.

For further information on the properties and preparation both of general purpose polystyrene and of HIPS, see the article on "Styrene Plastics" in volume 19 of Kirk-Othmer "Encyclopedia of Chemical Technology", pages 85-134, (1969), and references cited there.

For purpose of this invention, the specifications of the HIPS and of the general purpose polystyrene (GPS), if used, are suitably within the following ranges:

|  | HIPS | | GPS | |
| --- | --- | --- | --- | --- |
|  | Suitable | Preferred | Suitable | Preferred |
| Elastomer, % wt | 5–12 | 6–8 | 0 | 0 |
| Izod Impact (ft-lbs/inch) | ≧1.1 | ~1.4 | ~.2–.3 | ~.2–.3 |
| Tensile yield strength, psi | ≧3000 | ≧3500 | ≧6000 | ≧7000 |
| Vicat Softening temperature, °F. | | | | |

|  | HIPS | | GPS | |
|---|---|---|---|---|
|  | Suitable | Preferred | Suitable | Preferred |
| for extrusion | ≧210 | ≧216 | ≧210 | ≧216 |
| for injection molding | ≧185 | ≧200 | ≧185 | ≧200 |
| Melt index (condition G. 200° C.) | | | | |
| for extrusion | 1.5–4 | 1.5–3 | 1–4 | 1–3 |
| for injection molding | 5–15 | 6–10 | 5–25 | 10–20 |

Component "B" is a polyolefin selected from the group consisting of low-density polyethylene, high-density polyethylene and polypropylene. Each of these polyolefins is a commercially available material; their methods of preparation and properties are well-known. See the article on "Olefin Polymers" in Volume 14 of Kirk-Othmer "Encyclopedia of Chemical Technology", pages 217–335 (1967).

High density polyethylene has an approximate crystallinity of over about 75% and density in grams per cubic centimeter (g/cm$^3$) of between about 0.94 and 0.97 while low density polyethylene has an approximate crystallinity of over about 35% and a density of between about 0.90 g/cm$^3$ and 0.94 g/cm$^3$. Most commercial polyethylenes have a number average molecular weight of about 50,000 to about 500,000.

The polypropylene employed according to this invention consists predominantly of so-called isotactic polypropylene, as opposed to atactic polypropylene. The number average molecular weight of the polypropylene employed is typically in excess of about 100,000. Polypropylene is commercially characterized primarily by its melt flow range, which varies with its molecular weight range. Polypropylenes with melt flow index values in the range from 0.6 to 12 (as measured by ASTM method D-1238-70) are suitable for use in this invention.

Component "C" is a block copolymer X-Y-X. X represents polystyrene blocks and Y represents a polyolefin block. Such copolymers are preferably produced by first making a precursor block copolymer X-Y'-X in which Y' is polybutadiene and subsequently hydrogenating the block copolymer to substantially saturate the center block without significantly saturating the styrene polymer blocks. Block copolymers of this type and their methods of preparation are well-known. They are described in greater detail, for example, in U.S. Pat. No. 3,595,942, which also described their preparation, including suitable methods for the hydrogenation of the precursor polymers. The structure of the polymers is determined by their methods of polymerization. Linear polymers X-Y'-X are produced by sequential introduction of the desired monomers into the reaction vessel when using such initiators as lithium-alkyls or dilithiostilbene and the like, or by coupling a two segment block copolymer with a difunctional coupling agent. The presence of any coupling residues in the polymers may be ignored for an adequate description of the polymers forming a part of the compositions useful in this invention. Likewise, in the generic sense the specific structures also may be ignored. It is preferred that between about 35 and about 55 mol percent of the condensed butadiene units in the butadiene polymer block of the precursor polymer have 1,2 configuration. A typical, useful proportion of 1,2 structure is about 40%. When such a block is hydrogenated, the resulting product is identical to, or resembles, a copolymer block of ethylene and butene-1. Such a polymer, with polystyrene endblocks, may be designated an "S-EB-S" block polymer. A preferred polymer for this invention, an S-EB-S polymer in which the molecular weight of the S-blocks is about 7,500 and that of the EB block about 37,000, is designated "7.5S-37EB-7.5S". The molecular weight of the blocks is determined by gel permeation chromatography.

Hydrogenation of the precursor block copolymers is preferably effected by use of a catalyst comprising the reaction products of an aluminum alkyl compound with nickel or cobalt carboxylates or alkoxides under such conditions as to substantially completely hydrogenate at least 90% of the aliphatic double bonds while hydrogenating at most a small proportion of the alkenyl arene aromatic double bonds. Preferred block copolymers are those in which at least 99% of the aliphatic double bonds are hydrogenated while less than 5% of the aromatic double bonds are hydrogenated.

It has been found that effective block copolymers X-Y-X for use in this invention must have relatively low molecular weights. As illustrated in Example III, injection molded articles prepared from identically prepared compositions with block polymers (I) 7.5S-27EB-7.5S, (II) 10S-54EB-10S and (III) 29S-116EB-29S showed on testing that while the composition prepared with polymer I had satisfactory impact resistance, those prepared with II and III failed completely on impact testing. They evidently did not form the required interlocked structure. In studies employing a variety of intensive blending methods it has not been possible to produce satisfactory compositions with use of the higher molecular weight block polymers such as II and III. It is concluded that for use in this invention the block polymers should be S-EB-S polymers in which the total molecular weight is below about 60,000, that of the styrene blocks about 5,000–10,000 and that of the EB blocks about 25,000–50,000.

In the compositions utilized in this invention, the above components are present in the following proportions, expressed as parts per hundred parts by weight of total components A, B, and C:

|  | Suitable | Preferred | Most Preferred |
|---|---|---|---|
| Component "A": | 60–93 parts | 70–85 parts | 76–84 parts |
| Component "B": | 2–30 parts | 5–20 parts | 8–12 parts |
| Component "C": | 5–20 parts | 8–15 parts | 8–12 parts |

The ratio of component "C" to component "B" is in the range from 0.5:1 to 2:1, and preferably about 1:1.

Compositions within these ranges are capable of producing, by extrusion or injection molding, shaped articles which, compared to articles produced from high impact polystyrene without the addition of polyolefin, have greatly improved resistance to chemicals such as fatty materials.

It is known to persons skilled in the art of manufacturing plastic articles that different methods of manufacture require polymers having different melt properties. For example, polymers to be converted to sheet which is to be shaped by thermoforming desirably are more viscous than polymers to be employed in injection molding. The former have a lower melt flow or melt index, generally due to a higher molecular weight, than the latter. Compositions according to this invention can be prepared with different melt flow properties by selecting Components "A" and "B" having the appropriate flow properties.

In articles produced according to this invention, the improvement in resistance to fatty materials is ascribable primarily to the presence of the polyolefin component in the composition and its distribution in the article. However, the block copolymer component is essential for stabilizing the appropriate distribution of the polyolefin component. The polyolefin and the polystyrene are both present in the articles of this invention not as discretely dispersed particles but as continuous networks. This is evidenced by the fact that when a shaped composition according to the invention is treated with a solvent such as toluene to dissolve out the polystyrene and at least part of the block copolymer, the undissolved polyolefin remains as a porous structure, generally showing the shape of the original article and in particular showing a continuous or nearly continuous outer surface. In some cases, as in extruded sheet, the inner part may contain insufficient polyolefin to provide a continuous structure throughout after leaching, but this does not affect adversely the desired properties of the article. These articles will be referred to as having a skin layer which is substantially enriched in polyolefin. The thickness of the skin layer is in part a function of the method of manufacturing the article and of the thickness of the article. In a typical article, in cross section through the thickness of the article, at least the outer 5-10% of the article near the surface is substantially enriched in polyolefin, as determined by leaching or by scanning electron microscopy.

The distribution of the components of the composition which results in the skin layer of polyolefin is attributed to flow phenomena during the forming of the article, such as occur in extrusion and injection molding. It is thought that the polyolefin, being the lower viscosity component of the mixture, flows more easily than the other components in the region of highest shear, and hence there is some concentration of polyolefin near the walls while the mixture is flowing under pressure. The articles of this invention can be produced on commercially available extrusion or injection molding equipment.

In a further modification of this invention, grease resistant articles are produced in a secondary forming operation, such as thermoforming of sheet produced by extrusion of compositions of this invention.

Illustrative Embodiments

Th following examples and comparisons are provided to illustrate various aspects of the invention; it is to be understood that the invention is not to be regarded as limited by the illustrative examples.

Unless otherwise stated, the polymer blends employed in the examples were prepared by dry-blending all the ingredients and passing the mixture in a single pass through a twin screw extruder which had a screw conventionally employed for extrusion of polystrene and was operated at a maximum melt temperature of about 470° F.

Articles for testing were 100 mil thick sheet, prepared from the various compositions by extrusion through a sheet die at conventional conditions for polystyrene extrusion, unless otherwise stated in the text of the examples.

The compositions illustrated in the examples were prepared from several different grades of polystyrene homopolymer, impact-improved polystyrene-polybutadiene graft copolymer, polyethylene, polypropylene and S-EB-S copolymer. The following components were employed:

Commercial grades of styrene homopolymer, commonly referred to as crystal grade or general purpose grade of polystyrene (designated "GPS").

Commercial graft copolymers of polybutadiene and styrene, medium impact polystyrene (designated "MIPS") and high impact polystyrene (designated "HIPS").

Commercial grades of low density polyethylene (LDPE) and high density polyethylene (HDPE) and several commercial grades of polypropylene (PP).

The block copolymers BC-1 through BC-4 are "S-EB-S" polymers, BC-5 and BC-6 are SBS polymers and BC-6 is a two block S-EB polymer.

The significant properties of the thermoplastic components "A" and "B" employed in the Examples are shown in Table 1. Mechanical properties shown in Table 1 are specification data determined on injection-molded specimens.

The nominal compositions of block copolymer components "C" employed in the Examples are given in Table 2 in terms of the designations code described above. It will be seen from the Examples that only composition BC-1 was found satifactory for purposes of this invention.

The proportions of components "A", "B" and "C" employed in the Examples, and the properties of blends are shown in the tables 3-5.

The properties reported in the tables were measured by the following test methods:

| Property | ASTM Method |
| --- | --- |
| Melt Flow | D-1238 |
| Vicat Softening Temperature | D-1525 |
| Tensile Properties | D-638 |
| Flexural Modulus | D-1790 |
| Izod Impact | D-256 |
| Heat Distortion Temperature | D-648 |
| Rockwell Hardness | D-75 |
| Dart Impact Failure (DIF) | D-3029 |

Resistance to attack by fatty substances, reported as "Environmental Stress Cracking Resistance" (ESCR) was determined by cutting a sample strip from an extruded sheet transverse to the machine direction, clamping the sample over a mandrel which has a constant radius of curvature of 7 inches, coating the sample with a 50:50 mixture of cottonseed oil and oleic acid, holding the sample in place for 24 hours—at a strain of 0.7%—and thereafter measuring the flex modulus and tensile strength. The values are reported as percent of the corresponding values of a sample which had not undergone the contact test.

In addition, sample strips coated with said oil mixture were exposed to 1000 and 2000 psi loads and the time to breaking of the strip reported as time to failure.

TABLE 1
Properties of Thermoplastic Components Employed in Examples

| PROPERTY | COMPONENT "A" | | | | | COMPONENT "B" | | | | |
|---|---|---|---|---|---|---|---|---|---|---|
| | GPS-1 | GPS-2 | MIPS | HIPS-1 | HIPS-2 | LDPE | HDPE | PP-1 | PP-2 | PP-3 |
| Melt Flow, 200° C., g/10min, | 3* | 2* | 9* | 3.5* | 11* | 3.0** | 2.5** | 0.6*** | 5.0*** | 12*** |
| Vicat Softening Temp., °F. | 218 | 219 | 212 | 207 | 192 | 203 | 268 | 305 | 305 | 305 |
| Tensile Yield/psi | 7800 | 7500 | 4600 | 3600 | 2800 | 1790 | — | 4100 | 4400 | 4500 |
| Stress at Break | 7800 | 7500 | 4300 | 3300 | 2500 | — | 4000 | — | — | — |
| Elongation, % | 2 | 2 | 20 | 35 | 35 | 540 | — | >100 | >100 | >100 |
| Flexural Modulus, psi × $10^5$ | 4.5 | 3.8 | 3.2 | 2.9 | 0.23 | 1.4 | 1.8 | 1.95 | 2.0 | |
| Izod Impact, ft-lbs/inch, notched ¼" specimen | | | | | | | | | | |
| Room Temperature | 0.2 | 0.2 | 0.8 | 1.5 | 1.3 | no break | — | 1.0 | 0.6 | 0.5 |

*Condition G
**Condition E
***Condition L

TABLE 2
Types of Block Copolymers (Component C) Employed in the Examples

| Composition | Type |
|---|---|
| BC-1 | 7.5S-37.5EB-7.5S |
| BC-2 | 10S-54EB-10S |
| BC-3 | 29S-116EB-29S |
| BC-4 | 10S-53B-10S |
| BC-5 | 16S-75B-16S |
| BC-6 | 64S-38EP |

EXAMPLE I

Comparison of Preferred Blends According to the Invention With Conventional ABS and HIPS and With Blends Prepared Without HIPS The articles of this example were prepared from the compositions shown in Table 3. Composition I-X is a commercial grade of high impact ABS copolymer and I-Y a commercial high impact polystyrene. Compositions I-A and I-B are preferred blends according to this invention, containing, respectively, 80% HIPS and a blend of 40% HIPS with 40% general purpose polystyrene together with 8% polypropylene and 12% block copolymer. Composition I-Z contained only general purpose polystyrene (no HIPS), together with the same proportions and types of polypropylene and block copolymer as I-A and I-B.

The main object of this invention is to prepare articles which have an impact resistance in the neighborhood of that of high impact polystyrene and chemical resistance comparable to that of ABS. As shown in Table 3, ABS (I-X) has significantly higher yield and flex strength and somewhat higher heat resistance and impact strength, compared to commercial HIPS (I-Y). The major property in which HIPS is unable to compete with ABS in certain applications is chemical resistance. The articles from composition I-Y performed poorly in the tests of chemical resistance.

Comparing the properties of extruded sheet from compositions I-A and I-B, which are examples of preferred compositions according to this invention, with sheet from I-Y (commercial HIPS) shows that it is possible within the scope of this invention to match the heat resistance, strength and impact properties of HIPS and to obtain much greater chemical resistance. Comparing the properties of sheet from compositions I-A and I-B, it is seen that by replacing some of the HIPS component with general purpose polystyrene one increases the strength properties while decreasing impact resistance and somewhat decreasing chemical resistance.

Composition I-Z, which contains only general purpose polystyrene and no HIPS, gives sheet with greater strength properties than that from I-A or I-B, attributable to the general purpose polystyrene. However, the resulting impact resistance is in the same range as that of general purpose polystyrene. This composition, therefore, does not show the improvement in impact resistance which is said to be the purpose of invention U.S. Pat. No. 4,013,166 referred to in the discussion of the prior art, and is not within the scope of the present invention.

TABLE 3

| | I-X | I-Y | I-A | I-B | I-Z |
|---|---|---|---|---|---|
| Composition | | | | | |
| HIPS-1 | — | 100 | 80 | 40 | 0 |
| GPS-1 | — | 0 | 0 | 40 | 80 |
| PP-3 | — | 0 | 8 | 8 | 8 |
| BC-1 | — | 0 | 12 | 12 | 12 |
| ABS | 100 | — | — | — | — |
| PROPERTY | | | | | |
| Melt Flow, 200° C., g/10 min., Cond. G | 1.2 | 3.8 | 4.5 | 5.3 | 5.3 |
| Vicat Softening Temp., °F. | 216 | 208 | 208 | 210 | 220 |
| Heat Distortion Temp., 264 psi, annealed, °F. | 196 | 191 | 192 | 195 | 198 |
| Tensile Yield, psi | 6210 | 3780 | 2730 | 3650 | 5640 |
| Ultimate Yield, psi | 5680 | 3380 | 3020 | 3570 | 4940 |
| Tensile Elongation, % | 17 | 31 | 54 | 36 | 9 |
| Flexural Strength, psi | 11,900 | 7,000 | 5,600 | 7,250 | 10,400 |
| Flexural Modulus, psi × $10^5$ | 4.11 | 3.14 | 2.27 | 2.90 | 3.72 |
| Hardness, Rockwell R | 114 | 103 | 72 | 91 | 104 |
| Izod Impact, ft-lbs/inch, | | | | | |

TABLE 3-continued

|  | I-X | I-Y | I-A | I-B | I-Z |
|---|---|---|---|---|---|
| notched ¼" specimen[a] | | | | | |
| Room Temp. | 1.8 | 1.50 | 1.70 | 1.35 | 0.24 |
| −20° F. | 1.0 | 0.66 | 0.72 | 0.47 | 0.25 |
| DIF, ft-lbs/inch | | | | | |
| Room Temp. | | 520 | 440 | 380 | 145 |
| −40° F. | 380 | 315 | 165 | 15 | |
| Environmental Stress Cracking Resistance | | | | | |
| % retent of flex | | 64 | 100 | 93 | 0 |
| % retent. of tensile yield | | 81 | 92 | 94 | 0 |
| % retent. of elongation | | <1 | 46 | 26 | 0 |
| 1000 psi load, time to fail | | 1.7 | 5 days | 35 hrs | 2.6 hrs |
| 2000 psi load, time 5 fail | | 25 min | Stretches | 20 min | 74 min |

[a]Specimen injection molded

EXAMPLE II

Comparable Articles From Compositions Containing Polypropylene and Polyethylene Plaques for testing were prepared by injection molding from the compositions illustrated in Table 4. The components were blended in a single screw extruder and directly injected into the molds. Compositions II-A and II-D were prepared with polypropylene, II-B and II-E comparably with low density polyethylene and II-C and II-F comparably with high density polyethylene. Compositions A, B and C contained HIPS as the sole styrenic thermoplastic and D, E and F equal proportions of HIPS and general purpose polystyrene. In each case, the performance properties of the compositions prepared with polypropylene and polyethylene were satisfactory.

While the articles from compositions II-D and II-E in this case showed relatively low resistance to chemical attack, it was shown in other tests that at least compositions similar to II-D can show excellent environmental stress crack resistance (see Example I-B).

TABLE 4

|  | II-A | II-B | II-C | II-D | II-E | II-F |
|---|---|---|---|---|---|---|
| Composition | | | | | | |
| HIPS-1 | 80 | 80 | 80 | 40 | 40 | 40 |
| GPS-2 | 0 | 0 | 0 | 40 | 40 | 40 |
| PP-3 | 12 | 0 | 0 | 12 | 0 | 0 |
| LDPE | 0 | 12 | 0 | 0 | 12 | 0 |
| HDPE | 0 | 0 | 12 | 0 | 0 | 12 |
| BC-1 | 8 | 8 | 8 | 8 | 8 | 8 |
| PROPERTY | | | | | | |
| Vicat Softening Temp., °F. | 215 | 208 | 212 | 216 | 214 | 217 |
| Heat Distortion Temp., 264 psi, annealed, °F. | 189 | 190 | | 192 | 196 | |
| Tensile Yield, psi | 3100 | 3100 | | 4700 | 4250 | |
| Ultimate Yield, psi | 3200 | 2900 | | 3950 | 3700 | |
| Tensile Elongation, % | 76 | 66 | | 56 | 47 | |
| Flexural Strength, psi | 5515 | 5190 | 5565 | 7730 | 6500 | 7550 |
| Flexural Modulus, psi × 10⁵ | 2.07 | 2.16 | 1.95 | 3.16 | 2.84 | 2.85 |
| Hardness, Rockwell R | 72 | 74 | 71 | 88 | 76 | 88 |
| Izod Impact, ft-lbs/inch, notched ¼" specimen | | | | | | |
| Room Temp. | 1.1 | 2.1 | | 0.75 | 0.96 | |
| DIF, ft-lbs/inch | | | | | | |
| Room Temp. | 214 | 308 | 325 | 100 | 126 | 100 |
| −40° F. | | | | | | |
| Environmental Stress Cracking Resistance | | | | | | |
| 1000 psi load, time to fail | 16 | 144 | ~75 | 2 | 3.5 | 100 |

EXAMPLE III

Comparison With Related Composition Outside the Scope of This Invention

Compositions of 80 parts of HIPS-1, 12 parts PP-3, and 8 parts of block copolymers BC-2 through BC-6 were prepared. All the compositions were injection molded at a melt temperature of 530° F. to give 4 in.×4 in.×0.60 plaques, which were tested comparably to composition II-A of Example II. The plaques from compositions BC-2 through BC-5 gave falling dart impact resistance values too low to measure (less than 30 ft. lb./in. thickness). This contrasts with the value of under 25 ft. lb./in. thickness for general purpose polystyrene and 215 ft. lb./in. thickness for plaques prepared from the compositions employing corresponding amounts of BC-1.

The blends with very poor impact resistance showed brittle, mica-like fractures, very similar to blends of pure polypropylene with HIPS. In all these cases, the plaques seemed to separate under stress along the interfaces.

The composition prepared with the 2-block copolymer BC-6 formed plaques which had satisfactory impact resistance. However, when flexed, they cracked very readily along the direction of flex. The article prepared from the 2-block copolymer also showed poor resistance to stress or cracking under the influence of grease.

As a result of the study, it was concluded that block copolymers having significantly higher molecular weights than BC-1 are not useful in the composition of this invention and that articles prepared with the 2-block copolymer compare unfavorably with those according to the present invention, having relatively unsatisfactory grease resistance and poor resistance to flexing.

Unsatisfactory articles also resulted from compositions employing otherwise suitable components outside the specified ranges. For example, sheet from a composition containing 80 parts PS-1, 8 parts PP-2, and 12 parts BC-1 was compared with sheet made from compositions I-A and I-B. This sheet was particularly deficient in low impact resistance, compared to conventional HIPS, and therefore not useful for the purpose of the present invention. However, the articles showed satisfactory resistance to chemical attack.

EXAMPLE IV

Different Compositions For Different Forming Methods

It is known that the rheological properties of thermoplastics affect their performance in different methods of forming. It is therefore desirable to have, for example, plastics of different melt flow properties, depending on whether they are to be used in producing articles by injection molding or by thermoforming of sheet. For thermoforming, it is desirable to have a more viscous, i.e., low melt flow (higher molecular weight) plastic composition, such as HIPS-1 of the present examples. Compositions I-A and V-A of Table 5 illustrate suitable blends for thermoforming. A high melt flow composition is more suitable for injection molding, illustrated by composition V-B. Physical properties of these compositions vary about as expected for impact-improved polystyrene compositions of comparable melt flow; the chemical resistance of the compositions is satisfactory.

The polypropylene employed in composition V-A is a low flow polymer, more nearly comparable in melt flow and melt viscosity at mixing conditions to HIPS-1 than the polypropylene employed in I-A. While articles from both of these compositions were satisfactory, it was noted by extraction studies that extruded sheet formed from composition V-A had a more completely interlocked polymer network structure. It was concluded that there is some advantage in employing components A and B for the composition of the present invention which are most nearly identical in viscosity at the conditions of mixing.

TABLE 5

|  | 1A | VA | VB |
|---|---|---|---|
| Composition | | | |
| HIPS-1 | 80 | 80 | |
| HIPS-2 | | | 80 |
| PP-1 | | 8 | 8 |
| PP-3 | 8 | | |
| BC-1 | 12 | 12 | 12 |
| PROPERTY | | | |
| Melt Flow, 200° C., g/10 min., Cond. G | 4.5 | 3.7 | 8.4 |
| Vicat Softening Temp., °F. | 208 | 210 | 201 |
| Heat Distortion Temp., 264 psi, annealed, °F. | 192 | 191 | 185 |
| Tensile Yield, psi | 2730 | 2600 | 2020 |
| Ultimate Yield, psi | 3020 | 2870 | 2520 |
| Tensile Elongation, % | 54 | 52 | 87 |
| Flexural Strength, psi | 5600 | 5200 | 4300 |
| Flexural Modulus, psi $\times 10^5$ | 2.27 | 2.23 | 2.06 |
| Hardness, Rockwell R | 72 | 76 | 62 |
| Izod Impact, ft-lbs/inch, notched ¼" specimen[a] | | | |
| Room Temp. | 1.70 | 1.56 | 1.70 |
| −20° F. | 0.72 | 0.83 | 0.78 |
| DIF, ft-lbs/inch | | | |
| Room Temp. | 440 | 430 | 435 |
| −40° F. | 315 | 285 | 320 |
| Gardner DIF, ft-lbs/inch | | | |
| Room Temp. | 117 | 125 | 114 |
| −20° F. | 82 | 75 | 92 |
| Environmental Stress Cracking Resistance | | | |
| % retent. of flex | 100 | 93 | 70 |
| % retent. of tensile yield | 92 | 98 | 90 |
| % retent. of elongation | 46 | 70 | 36 |
| 1000 psi load, time to fail | 5 days | >7 days | 11 hours |
| 2000 psi load, time to fail | Stretches | Stretches | Stretches |

[a]Specimen injection molded

What we claim is:

1. An article resistant to attack by fatty substances, produced by extrusion or injection molding from a composition consisting essentially of
   (A) 60 to 93 parts by weight, per 100 parts of the compositions, of a polystyrene component consisting of 100 to about 45% of a thermoplastic styrene-diolefin elastomer graft copolymer with 0 to about 55% of thermoplastic styrene homopolymer;
   (B) 2 to 30 parts by weight, per 100 parts of the composition, of a polyolefin component selected from the group consisting of low density polyethylene, high density polyethylene and polypropylene and
   (C) 5 to 20 parts by weight, per 100 parts of the composition, of a block copolymer X-Y-X where each X is a polystyrene block of about 5,000 to 10,000 molecular weight and Y is a hydrogenated polybutadiene block of about 25,000 to 50,000 molecular weight, the total molecular weight of the block copolymer being less than about 60,000.

said article being characterized by having a skin layer substantially enriched in polyolefin, which imparts resistance to fatty substances.

2. Extruded sheet according to claim 1.
3. Hollow articles produced from extruded sheet according to claim 2.
4. Injection molded article according to claim 1.
5. A composition adapted to production of the articles of claim 1 by extrusion or injection molding, consisting essentially of
   (A) 60 to 93 parts by weight, per 100 parts of the compositions, of a polystyrene component consisting of 100 to about 45% of a thermoplastic styrene-diolefin elastomer graft copolymer with 0 to about 55% of thermoplastic styrene homopolymer;
   (B) 2 to 30 parts be weight, per 100 parts of the composition, of polyolefin component selected from the group consisting of low density polyethylene, high density polyethylene and polypropylene and
   (C) 5 to 20 parts be weight, per 100 parts of the composition, of a block copolymer X-Y-X where each X is a polystyrene block of about 5,000 to 10,000 molecular weight and Y is a hydrogenated polybutadiene block of about 25,000 to 50,000 molecular weight, the total molecular weight of the block copolymer being less than about 60,000.

* * * * *